US007234269B2

(12) United States Patent
Yonker et al.

(10) Patent No.: US 7,234,269 B2
(45) Date of Patent: Jun. 26, 2007

(54) ANIMAL TEST CHAMBER

(75) Inventors: James W. Yonker, Racine, WI (US); Tracy M. Lutterman, Mequon, WI (US); Nathan R. Westphal, Union Grove, WI (US); David A. Chars, Caledonia, WI (US); Kevin Stefanczyk, Franklin, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 273 days.

(21) Appl. No.: 10/876,810

(22) Filed: Jun. 25, 2004

(65) Prior Publication Data

US 2005/0284018 A1    Dec. 29, 2005

(51) Int. Cl.
*A01M 11/00* (2006.01)
*A01K 1/03* (2006.01)

(52) U.S. Cl. .................. 43/132.1; 43/124; 119/417; 119/419

(58) Field of Classification Search ............. 43/107, 43/124, 131, 132.1; 119/416, 417, 418, 419, 119/420, 421
See application file for complete search history.

(56) References Cited

U.S. PATENT DOCUMENTS

| | | | | |
|---|---|---|---|---|
| 3,830,201 | A * | 8/1974 | Coulbourn | 119/417 |
| 4,206,353 | A * | 6/1980 | Delgrosso | 250/343 |
| 4,348,985 | A * | 9/1982 | Leong | 119/420 |
| 4,674,490 | A * | 6/1987 | Frankel et al. | 128/200.14 |
| 4,794,549 | A * | 12/1988 | Van Albert et al. | 73/866 |
| 4,968,974 | A * | 11/1990 | Sakano | 340/573.3 |
| 5,081,955 | A * | 1/1992 | Yoneda et al. | 119/417 |
| 5,175,175 | A * | 12/1992 | Wilson et al. | 514/330 |
| 5,379,777 | A * | 1/1995 | Lomask | 600/529 |
| 5,429,741 | A * | 7/1995 | Webb et al. | 210/242.4 |
| 5,667,683 | A * | 9/1997 | Benian | 210/409 |
| 5,785,004 | A * | 7/1998 | Hobbs | 119/651 |
| 5,895,318 | A * | 4/1999 | Smrt | 454/256 |
| 5,915,332 | A * | 6/1999 | Young et al. | 119/421 |
| 6,393,900 | B1 * | 5/2002 | Buckner et al. | 73/61.56 |
| 6,443,164 | B1 * | 9/2002 | Parker et al. | 132/333 |
| 6,451,844 | B1 * | 9/2002 | Watkins et al. | 514/423 |
| 6,481,380 | B1 * | 11/2002 | Barnett, Sr. | 119/437 |
| 6,899,542 | B2 * | 5/2005 | Kurokawa | 434/236 |
| 2003/0049410 | A1 | 3/2003 | Munagavalasa et al. | |
| 2004/0020443 | A1 * | 2/2004 | Ohl | 119/417 |

FOREIGN PATENT DOCUMENTS

JP             5-36    *  1/1993

OTHER PUBLICATIONS

A Millon Temp Workers: 1998.
The Entomology Research Center: S.C. Johnson A Family Company.

* cited by examiner

*Primary Examiner*—David Parsley

(57) ABSTRACT

An animal test chamber has one or more side walls, a ceiling, and a floor to define an internal space in which animals can be housed and exposed to a chemical agent, a door, a port for introducing animals, an exhaust port, and one or more of the following four features. The first feature is a projector for projecting an image onto the chamber floor to assist in the counting of the knocked-down animals. The second feature is the capability of automatically washing/cleaning the chamber after a test. The third feature is the capability of simulating real life insecticide application conditions. The fourth feature is the capability of automatically dispensing the contents of an aerosol can into the chamber.

5 Claims, 3 Drawing Sheets

ANIMAL TEST CHAMBER

CROSS-REFERENCE TO RELATED APPLICATIONS

Not applicable.

STATEMENT REGARDING FEDERALLY SPONSORED RESEARCH/DEVELOPMENT

Not applicable.

BACKGROUND OF THE INVENTION

The present invention relates to animal test chambers for testing the effect of a chemical agent on animals such as insects. More particularly it relates to test chambers with improved accuracy, consistency, efficiency, and/or versatility.

The efficacy of an insecticide is typically tested in a Peet-Grady chamber, an approximately 6 cubic meter box-like room named after its initial developers. A conventional Peet-Grady chamber has a tight-fitting door for accessing the inside of the chamber, an observation window for observing and counting insects from outside the chamber, various ports on the side walls of the chamber for introducing insects and chemical agents into the chamber, an exhaust opening in the ceiling connected to an exhaust duct for removing insecticide vapor from the chamber, and sometimes a removable grid marked paper on the chamber floor for assisting the counting of the knocked-down insects. Insects are "knocked down" if they are incapacitated and rendered inactive, whether or not actually dead.

To operate such a chamber, one closes the chamber door tightly, closes all ports including the exhaust, introduces a plurality of insects (e.g., mosquitoes or house flies) into the chamber, allows the insects to acclimate to the chamber environment for a minute or two, dispenses the test chemical agent in the chamber, and counts the number of knocked-down insects on the chamber floor. At the end of the test, the total number of insects is counted. This is typically done by a user entering into the chamber and catching the insects that are not knocked-down one-by-one with a vacuum. The user also picks up the knocked-down insects from the floor grid one-by-one with the vacuum.

After each test, the user turns on the exhaust fan to remove insecticide vapor from the chamber. The user then usually washes the chamber walls, floor, and any other devices in the chamber manually with a sponge and water containing mild detergents (e.g., household detergents). The chamber walls and floor are then left to dry after which the chamber is ready for the next test.

The conventional Peet-Grady chamber and its use, as described above, has several drawbacks. Although conventional Peet-Grady chambers have been used with success for testing the effect of a chemical agent dispensed from an aerosol can, various features are significantly inconvenient and require manual operation and associated delays. For example, dosing a chamber with an aerosol requires a complex combination of manual operation of the aerosol can plus use of timed shutters to measure out the dose of spray.

Another drawback of a conventional Peet-Grady chamber relates to the counting grid on the chamber floor. Typically, the floor of a Peet-Grady chamber is covered with a grid sheet. This introduces the extra step of removing and disposing contaminated sheets after each test.

Yet another drawback of a conventional Peet-Grady chamber relates to the inefficiency of preparing the chamber for the next test cycle. The conventional Peet-Grady chamber is manually washed after each test, a process that is time consuming and relatively labor intensive, and may expose the user to several chemicals.

Further, a conventional Peet-Grady chamber is not specifically equipped to bleed air in and out of the chamber during a testing period. Tests are typically conducted in static air with all ports closed. Thus, a test designed to mimic real life housing conditions, where open doors and windows result in air circulation, cannot be readily conducted with a conventional Peet-Grady chamber.

Hence, a need exists for an improved Peet-Grady type chamber.

BRIEF SUMMARY OF THE INVENTION

The invention provides an animal test chamber for testing the effect of a chemical agent on animals. The chamber is especially useful for testing the effect of a chemical agent on insects. The term "insects" is used broadly here to encompass actual insects as well as arachnids and other small animals commonly controlled with insects. However, it can be used for other animal testing purposes.

The animal test chamber of the invention has one or more side walls, a ceiling, and a floor to define an internal chamber space in which animals can be housed and exposed to a chemical agent, a door, a port for introducing animals into the chamber, an exhaust port for withdrawing air and removing test chemicals from the chamber, an optional observation window, and one or more of the following four features.

The first feature is a projector capable of projecting an image onto the chamber floor to assist in the counting of the knocked-down animals (e.g., insects). Examples of images that can be projected to the floor include but are not limited to a grid, preferably of squares of the same size, and bull's-eye concentric circles. Examples of projectors that are useful include but are not limited to slide projectors and laser projectors (e.g., those manufactured by Derksen USA Inc., Orangevale, Calif.). In one embodiment, the projector is mounted on a side wall or ceiling of the chamber, preferably on the outside surface of the side wall or ceiling and projects the image onto the chamber floor through a window on the wall or ceiling. The window can be an opening or an opening covered with a material (e.g., glass) that is suitable for transmitting the projection rays. Optionally, the operation of the projector is controlled by a computer.

The second feature is a spray head capable of spraying a cleaning liquid inside the chamber. Examples of suitable cleaning liquids include but are not limited to water, preferably deionized water, and mild detergent solutions. A cleaning cycle may include a detergent cleansing stage and a water rinsing stage. Preferably, the spray head can be moved between a position inside the chamber and a position outside the chamber. In one embodiment, the spray head and a pray head operator are mounted outside the chamber on and between two parallel boards connected to the outside surface of the chamber ceiling. The ceiling has an opening that is lined up with the spray head through which the spray head can move into and out of the chamber. The opening can be equipped with a sliding or swinging door. During a testing period, the spray head stays outside of the chamber and can be hidden from the chamber as the sliding or swinging door is closed. After the test is done, the door can slide or swing open and the spray head operator sends the spray head into the chamber to clean the chamber. After the cleaning, the spray head operator retracts the spray head to the outside of the chamber. In another embodiment, the spray head and its operator are mounted inside of an exhaust duct that is connected to an exhaust port/opening located at the ceiling of the chamber and the spray head can descend into and retract back from the chamber through the exhaust opening. Optionally, the cleaning operation, which include moving the spray head into and out of the chamber, the open and close of the spray head hiding door, and the nature (e.g., single or multiple stages) and duration of a cleaning cycle, is controlled by a computer.

Also included in the second feature are a drain adjacent the chamber floor for draining the cleaning liquid and a drain cover for sealing the drain. The drain cover is configured in such a way that it introduces little interruption (e.g., protrusions and recessions) to the flow of the floor surface when it seals the drain. For example, if the chamber floor is a flat floor, a flat face drain and cover can be designed so that when the cover is fitted to seal the drain, it substantially maintains the continuity of the flat surface of the floor. This arrangement is advantageous in that it keeps any interference caused by the inclusion of a drain and its cover on the chamber floor, such as the trapping of the insects and chemicals around the drain and its cover, to a minimum. In one embodiment, the drain cover is a removable plug. In another embodiment, the drain cover is a sliding or swinging door. The sealing and opening of the drain can be conducted manually or controlled by a computer.

The third feature relates to one or more air intake ports, preferably located on the side wall(s) and/or ceiling of the chamber, to allow air intake in a controlled manner during a testing period. The air intake ports can be fitted with insect screens to prevent insects from escaping through the ports. The air intake ports can also be fitted with an air flow control gate to achieve one-way air flow from outside to inside of the chamber (the intake flow) when desired. For example, the control gate can be a one-way gate that only opens towards the inside of the chamber and thus inhibits reverse flow. Alternatively, the gate can be a simple sliding door. During a testing period, the door is slid open only when the exhaust port is withdrawing air from the chamber (e.g., by the operation of an exhaust fan) so that the negative air pressure inside the chamber will only allow the intake flow to pass through the ports. For tests in which the exhaust fan is kept on from the beginning to the end, the intake flow is achieved automatically for the whole testing period. No air control gate is necessary. Other mechanisms for producing air intake flow at the air intake port(s), such as fan(s) installed at the port(s), either controlled by a computer or not, can also be employed to facilitate air exchange in the chamber. Preferably, the operating speed and duration of the fans as well as the opening and closing of the air flow control gate, if any, are controlled by a computer to provide a desired rate of air exchange. In this regard, air flow sensors can be employed.

The intake air ports can also provide forced air into the chamber to help dry the chamber after it is cleaned and thus improve the turn over time between test cycles.

The fourth feature relates to an automatic can operator for the chamber. The operator is preferably located outside of the chamber and has a can holder for receiving and holding an aerosol can and an automated actuator arm for actuating the can. The can holder's position can be adjusted for aligning a spray nozzle on the can with a port on the chamber. The port is for introducing test chemical agents into the chamber and can be equipped with a door. Preferably, the can holder is connected to a motor which can drive the holder to oscillate for maintaining formulation suspension/mixture inside the can.

In operation, a user mounts the can onto the can operator, aligns the spray nozzle with the port, opens the port door, engages the automatic actuator arm to activate the can to dispense the can contents into the chamber for a predetermined period of time, and closes the port door.

In one embodiment, several additional steps are also performed before and after the can contents are released into the chamber to facilitate the delivery and determination of an accurate amount of chemical agent into the chamber. In this regard, a user would first test/calibrate an aerosol can in a remote fume hood to determine the amount of the chemical agent released in a given period of time. The user would then agitate the can before mounting it onto the can operator. The user would also turn on the motor, if equipped, to oscillate the can. The user would next engage the automatic actuator arm to activate the can for a short period of time to clear the dip tube inside the can (prime/purge the can). A collection hood would be provided for this purge/prime step to collect/control the purge/prime liquid and gas. The collection hood would either be positioned or be capable of moving to a position where it would not interfere with the actual spray of the can contents into the chamber. After the purge/prime step, the user would measure the weight of the can for later determining the actual amount of can contents released into the chamber. Following the delivery of a timed spray, a user would then measure the weight of the can again for determining the actual amount of can contents released into the chamber.

Any or all of the operations of the can operator, such as the intensity and duration of can oscillation, the clearing of the dip tube, the operation of the collection hood, the open and close of the port door, the timed spray of can contents, and the weighing of the can before and after the spray, can be controlled and coordinated by a computer.

In another aspect, the invention provides methods for using the animal test chamber.

To test the effect of a chemical agent with an animal test chamber of the invention, a user introduces a plurality of animals (e.g., insects) into the chamber, allows the insects to acclimate to the chamber environment for a certain period of time, releases the chemical agent into the chamber, counts the knocked-down animals on the chamber floor after a predetermined period of time, counts the total number of animals introduced into the chamber, removes all animals from the chamber, removes chemical agents from the chamber, and cleans and dries the chamber. Depending on the particular improved feature(s) that the chamber has, one or more of the above steps may be performed with the improved feature(s). For example, if the an image projector is provided to the chamber, the counting step is assisted by an image projected to the chamber floor. If a spray head and a drain is provided, the cleaning step is performed automatically with the spray head. If air-intake ports are provided, the testing of the chemical agent can be conducted with air bleeding into the chamber. If an automatic can operator is provided, the release of the can contents into the chamber can be performed with the operator as described above. Any or all of the above steps can be controlled and coordinated by a computer.

The animal test chamber of the invention and methods of using the chamber provide a number of advantages. First, with an image projector projecting the image onto the chamber floor, the disadvantages associated with using grid paper sheets on the floor are avoided. It is also easier to provide a variety of image patterns on the chamber floor with the projector. Second, the automatic cleaning of the chamber with a spray head provides faster and more consistent cleaning. It also reduces the risk of exposing a user to various chemicals. Third, the air intake ports allow the tests to be conducted under simulated real life conditions. The air intake ports can also provide forced air to dry the chamber. Fourth, the automatic can operator allows more accurate and consistent delivery of a certain amount of testing chemical agents into the chamber.

The foregoing and other advantages of the invention will become apparent from the following description. In the following description reference is made to the accompanying drawings which form a part thereof, and in which there is shown by way of illustration preferred embodiments of the invention. Such embodiments do not represent the full scope of the invention. Reference should therefore be made to the claims herein for interpreting the scope of the invention.

DETAILED DESCRIPTION OF THE PREFERRED EMBODIMENTS

Figure 1:
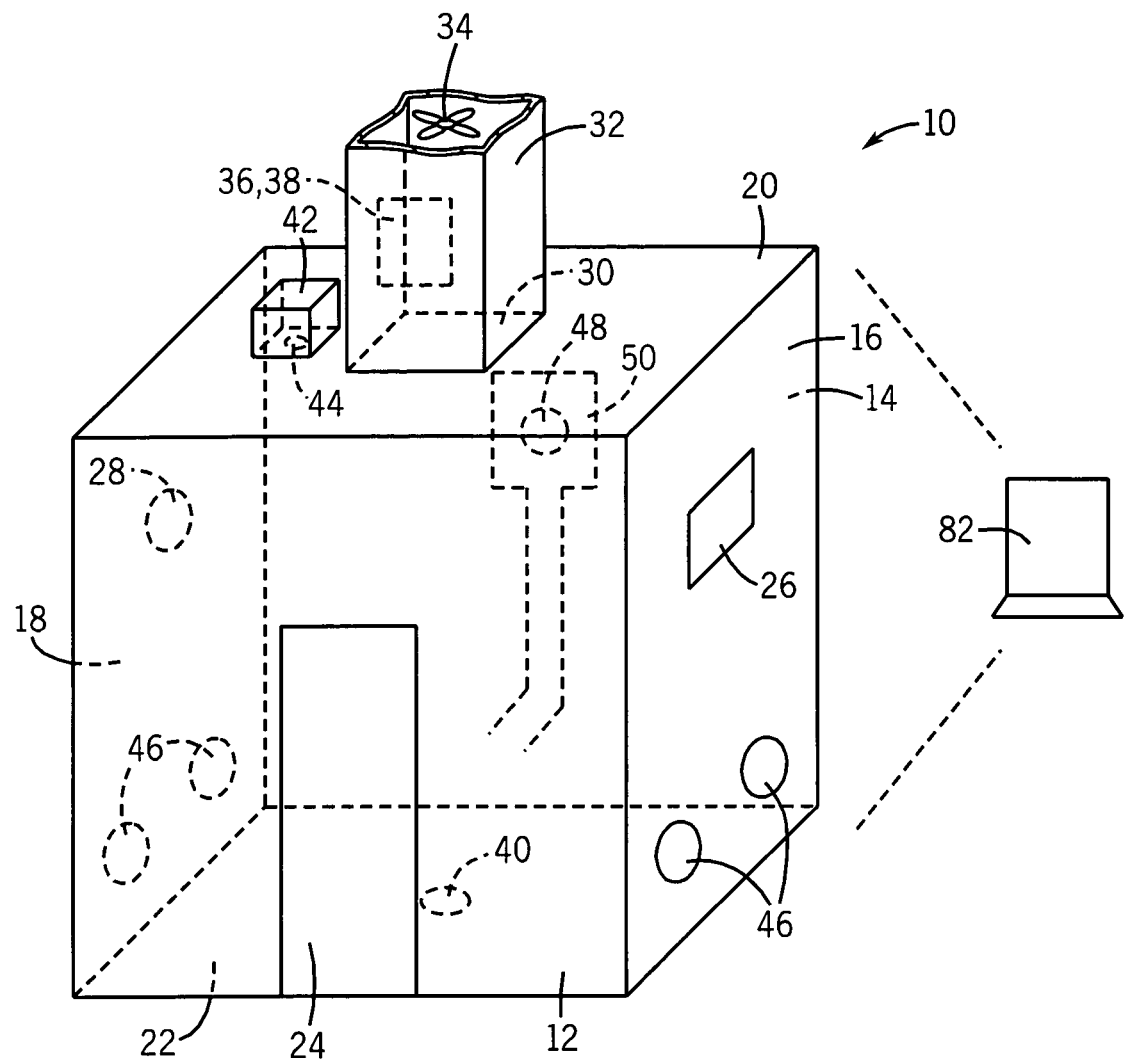
FIG. 1 is a schematic drawing showing one embodiment of an animal test chamber of the present invention (collection hood not shown).
Figure 2:
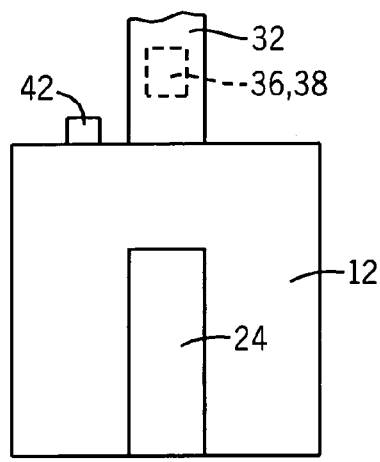
FIG. 2 is a schematic drawing showing the front view of the embodiment in FIG. 1.
Figure 3:
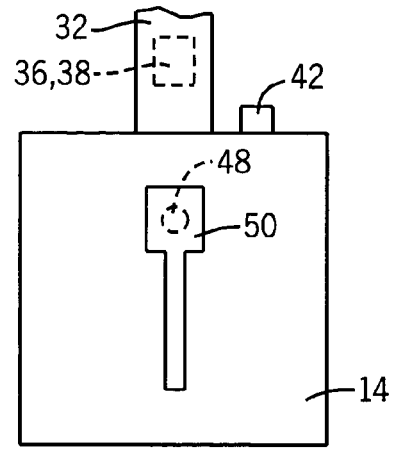
FIG. 3 is a schematic drawing showing the back view of the embodiment in FIG. 1 (collection hood not shown).
Figure 4:
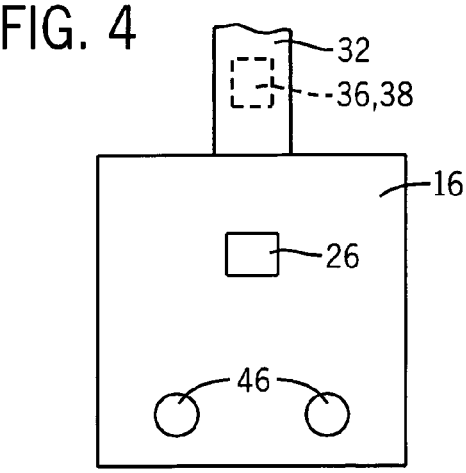
FIG. 4 is a schematic drawing showing the right side view of the embodiment in FIG. 1 (aerosol can operator not shown).
Figure 5:
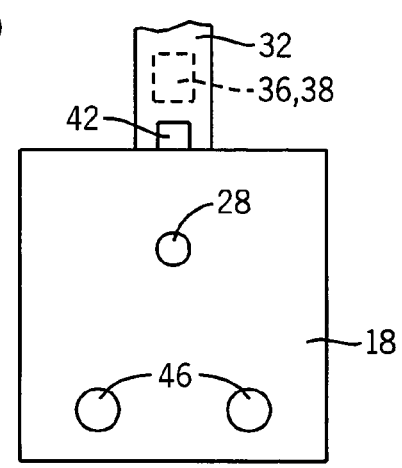
FIG. 5 is a schematic drawing showing the left side view of the embodiment in FIG. 1 (aerosol can operator not shown).
Figure 6:
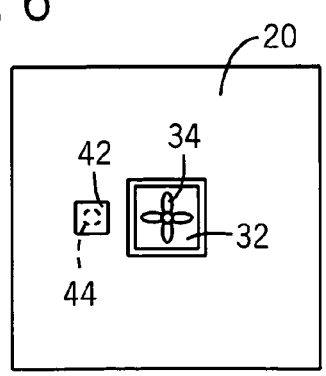
FIG. 6 is a schematic drawing showing the top view of the embodiment in FIG. 1 (aerosol can operator not shown).
Figure 7:
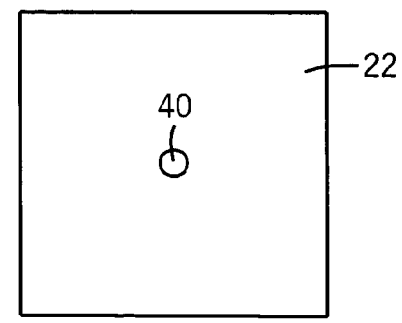
FIG. 7 is a schematic drawing showing the bottom view of the embodiment in FIG. 1 (aerosol can operator not shown).

FIGS. 1-10 provide schematic showings of one embodiment of the animal test chamber of the present invention. The same parts/structures are numbered the same in FIGS. 1-10.

In this embodiment, the animal test chamber 10 has a front wall 12, a back wall 14, a right side wall 16, a left side wall 18, a ceiling 20, and a flat floor 22. There is a chamber door 24 located in the front wall 12 and an observation window 26 located in the right side wall 16. The chamber walls, ceiling, floor, and door are preferably made of a material selected from wood, steel, or glass. For any part that is made of wood, the inside surface is preferably painted with a non-porous chemical resistant paint. The observation window is preferably made of one-way observation glass.

There is an insect port 28 located on the left side wall 18. The insect port is equipped with an insect port door (not shown in FIGS. 1-10). There is an exhaust opening/port 30 on ceiling 20. The exhaust port is connected to an exhaust duct 32, which is equipped with an exhaust fan 34. A spray head 36 and a spray head operator 38 are mounted to duct 32 from the inside. The exhaust port is equipped with a moveable insect screen (not shown in FIGS. 1-10). During a testing period, the screen covers the port to prevent insects from escaping. During a cleaning period, the screen moves aside to allow the spray head to descend and clean the chamber. A flat drain 40 is located adjacent to the chamber floor 12 to drain the cleaning liquid during a cleaning period. During a testing period, the drain is sealed with a drain plug (not shown in FIGS. 1-10) which is configured to smoothly merge with a floor surface adjacent thereto when applied to the drain.

A projector 42 is mounted to the ceiling 20 and can project an image onto the chamber floor 22 through a glass window 44 located in the ceiling.

The chamber 10 has a total of four air intake ports 46, two located in the right side wall and two located in the left side wall. Each of the air intake ports is equipped with an insect screen (not shown in FIGS. 1-10) to prevent insects from escaping from the chamber.

Figure 8:
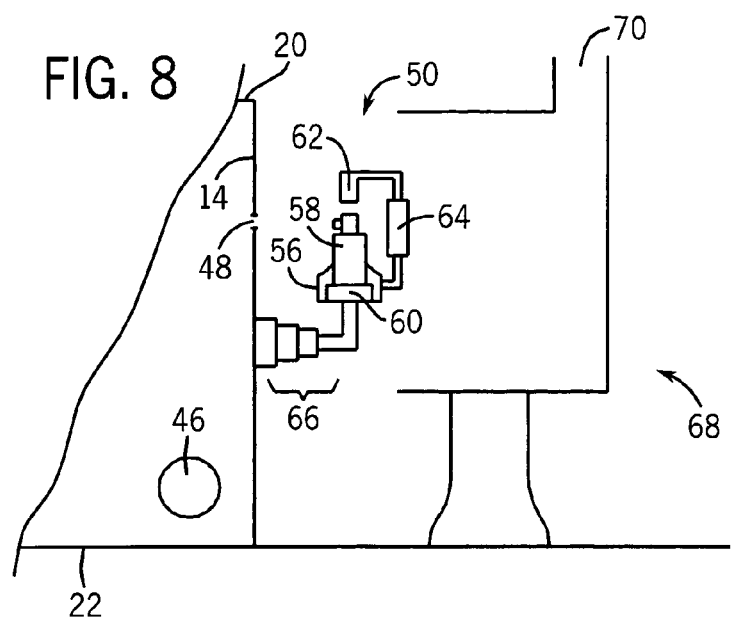
FIG. 8 is schematic drawing showing an aerosol can operator and a collection hood from the right side of the chamber in FIG. 1.

A port 48 is located in the back wall of the chamber for introducing insects into the chamber. An aerosol can operator 50 is mounted to the back wall. As schematically shown in FIG. 8, the aerosol can operator 50 has a can holder 56 that holds an aerosol can 58 on a scale 60 located inside the holder. The can operator has an automatic actuator arm 62 that can move up and down by moving out of and into cylinder 64. The can operator also has a set of extension cylinders 66 for moving the can between port 48 and collection hood 68. The collection hood has a hood exhaust duct 70.

Figure 9:
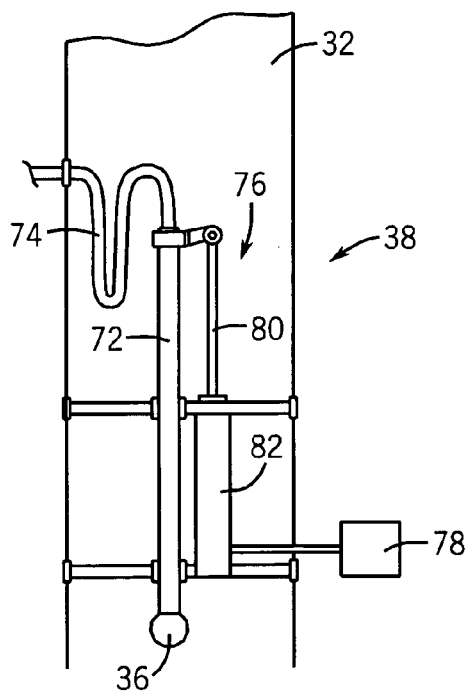
FIG. 9 is a schematic drawing showing a spray head operator with the spray head hidden inside the exhaust duct.
Figure 10:
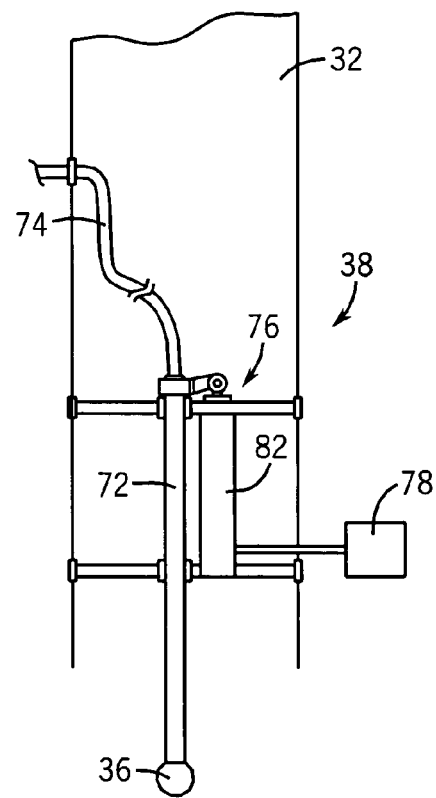
FIG. 10 is a schematic drawing showing a spray head operator with the spray head extending into the chamber.

The spray head 36 and spray head operator 38 as well as their operation are further shown in FIGS. 9 and 10. The spray head operator has a water pipe 72 connected to a flexible hose 74 through which the cleaning and rinsing liquids can be supplied to the spray head. The spray head operator further has a lift assembly 76. The lift assembly has a motor 78, a shaft 80 connected to the water pipe 72, and a cylinder 82. The motor can drive the shaft to move into and out of the cylinder to descend and retract the spray head from the chamber.

The operation of the animal test chamber is mostly controlled by a computer 82. In operation, a user first opens the insect port door to introduce a plurality of insects into the chamber and closes the door. The user also tests/calibrates an aerosol can in a remote fume hood to determine the amount of can contents released in a given period of time. The user inputs the information into the computer and the computer calculates the can release time needed for a particular test. The user shakes the can and mounts it onto the can operator 50. The computer then signals the can operator to oscillate to mix the can contents. The can is then primed/purged to clear its dip tube. A collection hood is provided for the prime/purge step to collect and control the prime/purge liquid and gas. Next, the spray nozzle of the can is aligned with port 48. The computer sends signals to open the port door, to engage the automatic actuator arm to activate the can to release the testing chemical agent into the chamber, to stop the release after an appropriate amount of the chemical agent is released, and to close the port door. The can operator is equipped with a scale which measures the weight of the can continuously while its content is being released. The real time weight data is recorded by the computer and can be used by the computer to determine when to stop the spray.

After the insects are exposed to the chemical agent for a predetermined period time, the computer sends a signal to the projector to project a grid onto the chamber floor and the user counts the knocked-down insects on the floor. Multiple counts can be conducted at predetermined intervals. The computer can also send signals to turn on the exhaust fan to generate a negative air pressure inside the chamber so that outside air bleeds into the chamber through the four air intake ports 46. This mimics the real world conditions in which a room has windows or door open when it is sprayed. The computer can control the air exchange rate and duration by controlling the speed and time of operation of the exhaust fan.

At the end of the test, the computer sends signals to turn off the projector and turn on the exhaust fan, if not already on. The user then enters the chamber with a special vacuum to catch and count the insects that are not knocked-down, if any, as well as the knocked-down insects on the floor. After removing all insects from the chamber, the user removes the drain plug (not shown in FIGS. 1-10) from drain 40, exits the chamber, and closes chamber door 24. The user then puts the drain plug into a special plug holder (not shown in FIGS. 1-10). The fitting of the plug into the holder sends a signal to the computer that the user is out of the chamber and the chamber door is closed. Upon receiving the signal, the computer sends signals to the spray head operator to start the washing/rinsing cycle.

For the washing/rinsing cycle, the computer first sends signals to open the exhaust port and moves the spray head into the chamber. The spray head then sprays liquid(s) with high pressure to clean the chamber. The user can dictate the washing/rinsing cycle through the computer in terms of the type of liquid(s) sprayed, the spray pressure, and the duration of a spray. After the cleaning step, the computer sends signals to retract the spray head into the exhaust duct and to turn on the exhaust fan to create forced air flow in the chamber to dry the chamber. The chamber is dried and ready for the next test cycle.

The above description has been that of preferred embodiments of the present invention. It will occur to those that practice the art, however, that still other modifications may be made without departing from the spirit and scope of the invention. In order to advise the public of the various embodiments that may fall within the scope of the invention, the following claims are made.

INDUSTRIAL APPLICABILITY

The present invention provides animal test chambers useful for testing the effect of a chemical agent on animals, especially the effect of an insecticide on insects.

We claim:

1. A test chamber for testing the effect of a chemical agent on animals, the chamber comprising:
   (1) one or more side walls;
   (2) a ceiling;
   (3) a floor, wherein the side wall(s), ceiling, and floor define an internal chamber space in which animals are adapted to be housed and exposed to a chemical agent, and where the floor defines a flat floor portion;
   (4) a door located on a side wall of the chamber;
   (5) a port for introducing animals into the internal chamber space;
   (6) an exhaust port adapted to withdraw air from the internal chamber space; and
   (7) an automatic cleaning system that comprises:
      a spray head adapted to spray a cleaning liquid inside the chamber, wherein the spray head is adapted to be automatically moved between a first position outside the internal chamber space and a second position inside the internal chamber space;
      a drain located adjacent the chamber floor; and
      a drain cover adapted to seal and unseal the drain in automated fashion so that when the drain cover is sealing the drain it is configured to smoothly merge with a floor surface adjacent thereto to essentially maintain the flat continuity of the chamber floor adjacent the drain.

2. The animal test chamber of claim 1, wherein the first position is inside an exhaust duct connected to the exhaust port.

3. A test chamber for testing the effect of a chemical agent on animals, the chamber comprising:
   (1) one or more side walls;
   (2) a ceiling;
   (3) a floor, wherein the side wall (s), ceiling, and floor define an internal chamber space in which animals are adapted to be housed and exposed to a chemical agent;
   (4) a door located on a side wall of the chamber;
   (5) a port for introducing animals into the internal chamber space;
   (6) an exhaust port adapted to withdraw air from the internal chamber space; and
   (7) an aerosol can operator adapted to hold and automatically activate an aerosol can to release the chemical agent from the can into the internal chamber space;
   wherein the aerosol can operator is located outside the internal chamber space and the chamber further comprises a port located on a side wall or the ceiling of the chamber through which the chemical agent is adapted to be introduced into the internal chamber space;
   wherein the aerosol can operator is adapted to move an aerosol can between a first spraying position at which a spray nozzle of the can sprays can contents into the internal chamber space, and a second position; and
   wherein a collection hood is provided at the second position so that the aerosol can is primed inside the collection hood without spraying can contents into the internal chamber space.

4. The animal test chamber of claim 3, wherein the collection hood can move between a first position at which an aerosol can located on an aerosol can operator can be moved into the hood and a second position at which the hood will not interfere with the release of can content into the internal chamber space.

5. A test chamber for testing the effect of a chemical agent on animals, the chamber comprising:
   (1) one or more side walls;
   (2) a ceiling;
   (3) a floor, wherein the side wall (s), ceiling, and floor define an internal chamber space in which animals can be housed and exposed to a chemical agent;
   (4) a door located on a side wall of the chamber;
   (5) a port for introducing animals into the internal chamber space;
   (6) an exhaust port adapted to withdraw air from the internal chamber space; and
   (7) an aerosol can operator adapted to hold and automatically activate an aerosol can to release the chemical agent from the can into the internal chamber space;

wherein the aerosol can operator is located outside the internal chamber space and the chamber further comprises a port located on a side wall or the ceiling of the chamber through which the chemical agent is adapted to be introduced into the internal chamber space;

wherein the aerosol can operator is adapted to move an aerosol can between a first spraying position at which a spray nozzle of the can sprays can contents into the internal chamber space, and a second position;

wherein a collection hood is provided at the second position so that the aerosol can is primed inside the collection hood without spraying can contents into the internal chamber space; and wherein the aerosol can operator further comprises a scale for measuring the weight of the can while the chemical is being released from the can.

\* \* \* \* \*